United States Patent [19]
Wood et al.

[11] 3,854,322
[45] Dec. 17, 1974

[54] CALIPER GAUGE
[75] Inventors: David F. Wood, Acton; Richard F. Murphy, Wilmington, both of Mass.
[73] Assignee: LFE Corporation, Waltham, Mass.
[22] Filed: June 6, 1973
[21] Appl. No.: 367,631

[52] U.S. Cl. ............................................. 73/37.5
[51] Int. Cl. ........................................... G01b 13/02
[58] Field of Search .................. 73/37.5, 37.6, 37.7; 324/34 TK; 33/147 N, 172 E; 137/85

[56] References Cited
UNITED STATES PATENTS
1,946,924  2/1934  Allen et al. ...................... 324/34 TK
3,025,696  3/1962  Matteson ............................. 73/36.6
3,513,555  5/1970  Vachon ............................. 33/147 L FOREIGN PATENTS OR APPLICATIONS
839,996   6/1960   Great Britain ...................... 73/37.5
271,814   9/1970   U.S.S.R. ............................ 73/37.5

Primary Examiner—Donald O. Woodiel
Attorney, Agent, or Firm—Richard J. Donahue

[57] ABSTRACT

A caliper gauge for continuously measuring the thickness of a moving layer in which a sensing head is held at a uniform spacing from a layer of material being measured by a pneumatic piston positioned by a feedback control system responsive to a comparison between a reference pneumatic nozzle and a pneumatic nozzle in the sensing head facing the layer being measured. The distance of the sensing head from an electrical conductor underlying the layer being measured is monitored electromagnetically to derive layer thickness.

8 Claims, 4 Drawing Figures

CALIPER GAUGE

BACKGROUND OF THE INVENTION

1. Field of the Invention

The present invention relates to thickness gauges and particularly to those using pneumatic means to space a sensing element a fixed distance from the surface of a moving layer being measured.

2. Relation to the Prior Art

Modern industry is providing ever increasing demands for both speed and quality control. The greater the speed, the more important quality control becomes since tremendous amounts of material can be wasted in a short time due to errors in processing machinery. Many types of sheet material, paper, plastic, and metal among them, are being manufactured today at speeds of many feet per second. The demands for close tolerance limits are great and thickness gauging apparatus must be both fast and sensitive. Particularly at high speeds, any kind of physical contact between the material being monitored and the monitoring instrument is undesirable. Thus, air cushions or other means for maintaining a constant but small space are utilized.

Thickness is gauged pneumatically, electrically, electromagnetically, or by other suitable means usually responsive to the up and down movement of a sensing element in keeping a constant small space from the sheet being monitored. It is possible to measure thickness by backpressure on an air nozzle as described in U.S. Pat. No. 2,692,498 to Knobel. For this purpose, the air nozzle can be rigidly fixed at a predetermined distance above the path of the moving sheet. Difficulties are encountered in the extreme nonlinearity of such a device and low sensitivity as the space between the sheet surface and nozzle increases.

U.S. Pat. No. 3,164,981 also to Knobel discloses a more sophisticated system in which backpressure on an air nozzle posed above the sheet being measured is reflected to a pneumatic piston also provided with a second air source. The piston moves the nozzle up or down until the pressure driving the piston balances with the reflected nozzle pressure. A reference foot of magnetic material is positioned behind the sheet being monitored and a magnet is suspended by spring members from the nozzle assembly. As the sheet material being monitored becomes thinner, nozzle and magnet move closer to the reference foot. The magnetic attraction becomes stronger and the magnet moves an additional amount closer as permitted by flexure of the springs. Movement of the magnet relative to the nozzle assembly changes backpressure on a second nozzle and variations in that backpressure indicate thickness of the sheet. Again this system depends upon reading backpressure on an air nozzle, and while the nonlinearities can be reduced in this fashion, they still exist. There is a further problem that in any rapid movement of the piston, inertia of the magnet will induce some erroneous fluctuations.

A thickness gauge available from the B.C. Ames Company of Waltham, Massachusetts utilizes a piston similar to that described in the above U.S. Pat. No. 3,164,981 utilizing a feedback control system responsive to backpressure on an air nozzle to move the nozzle up or down maintaining the backpressure and therefore the distance of the nozzle from the surface constant.

The controlled spacing is determined by a mechanical force balanced against reflected nozzle pressure. Thickness of the sheet material being measured is determined by the position of the sensing head. This system is subject to errors resulting from change in temperature and other ambient conditions.

U.S. Pat. No. 3,513,555 to Vachon uses an air cushion principle to maintain fixed space from the surface being monitored and senses the distance of the sensing head from a reference foot of magnetic material by an electromagnetic sensing device. While the electromagnetic sensing device has the capability of high speed and accuracy in sensing the space from the reference foot, the air cushion arrangement is cumbersome and limits the flexibility of utilization. Surface shape and texture will affect the air cushion and the air cushion is not well suited to point scanning.

Desirably, the thickness gauge for monitoring moving sheet material should be capable of high speed, reciprocating movement for response to defects producing wide variations in thickness over a small area of the material being monitored. When operating in the correct monitoring region, sensitivity should be much higher so that the device essentially operates with both course and fine modes. Some form of automatic dampening is desirable to prevent "hunting."

Still another desirable feature is some form of interlock for producing rapid retraction in case some type of unusual obstruction on the moving sheet material makes physical contact with the sensing head.

SUMMARY OF THE INVENTION

Now in accordance with the present invention a caliper gauge is provided using a feedback control amplifier in a closed control system responsive to backpressure on an air nozzle to drive an air piston up or down carrying the nozzle and a sensing head with it.

The pressure from the control amplifier drives the air piston down and a spring under the piston moves the piston up upon reduction of pressure. To dampen overshoot and provide a more precise control when the sensing head is extended into the operating position, a feedback connection is provided to the coontrol amplifier from the space below the air piston. The sensing head is hinged allowing it to swing away from the work upon encountering a moving obstruction carried by the work layer. A pneumatic interlock senses pivotal movement of the head and operates a retract solenoid which opens the piston to atmosphere resulting in rapid retraction of the sensing head.

The spacing of the sensing head air nozzle from the work is determined by comparing backpressure from the nozzle with set point pressure at the input of the control amplifier. In the present invention the set point pressure is derived from a similar air nozzle facing a reference surface set at a predetermined spacing. Thickness of the work layer is determined by sensing the space between the sensing head and a reference underlying the work. Electromagnetic sensing may be used. The underlying reference may be either a special reference foot or it may be a conductor or conductors forming a further layer in the work material.

Thus, it is an object of the invention to provide a novel caliper gauge for monitoring the thickness of a moving layer.

It is a further object of the invention to provide a pneumatic feedback control system for positioning a thickness sensing head a predetermined distance above material to be gauged and utilizing a feedback connection from the pneumatic positioning device to damp out hunting and overshoot.

It is a further object of the invention to provide a pneumatic feedback control system for positioning a sensing head a predetermined distance from the work surface by driving a pneumatic positioning piston until an air nozzle in the sensing head detects a backpressure equal to backpressure on a second nozzle facing a reference surface.

Yet another object of the invention is to provide a caliper gauge for measuring the thickness of a moving layer in which the sensing head of the gauge is pivotally mounted and activates a retract interlock upon being pivoted by contact with a moving obstruction.

Further objects and features of the invention will become apparent upon reading the following description together with the drawing.

DESCRIPTION OF THE PREFERRED EMBODIMENT

In position sensing of a dielectric nonmagnetic material without physical contact, electrooptical and pneumatic devices are most commonly used. As in the present invention, thickness gauges have often relied on pneumatic devices.

Figure 1:
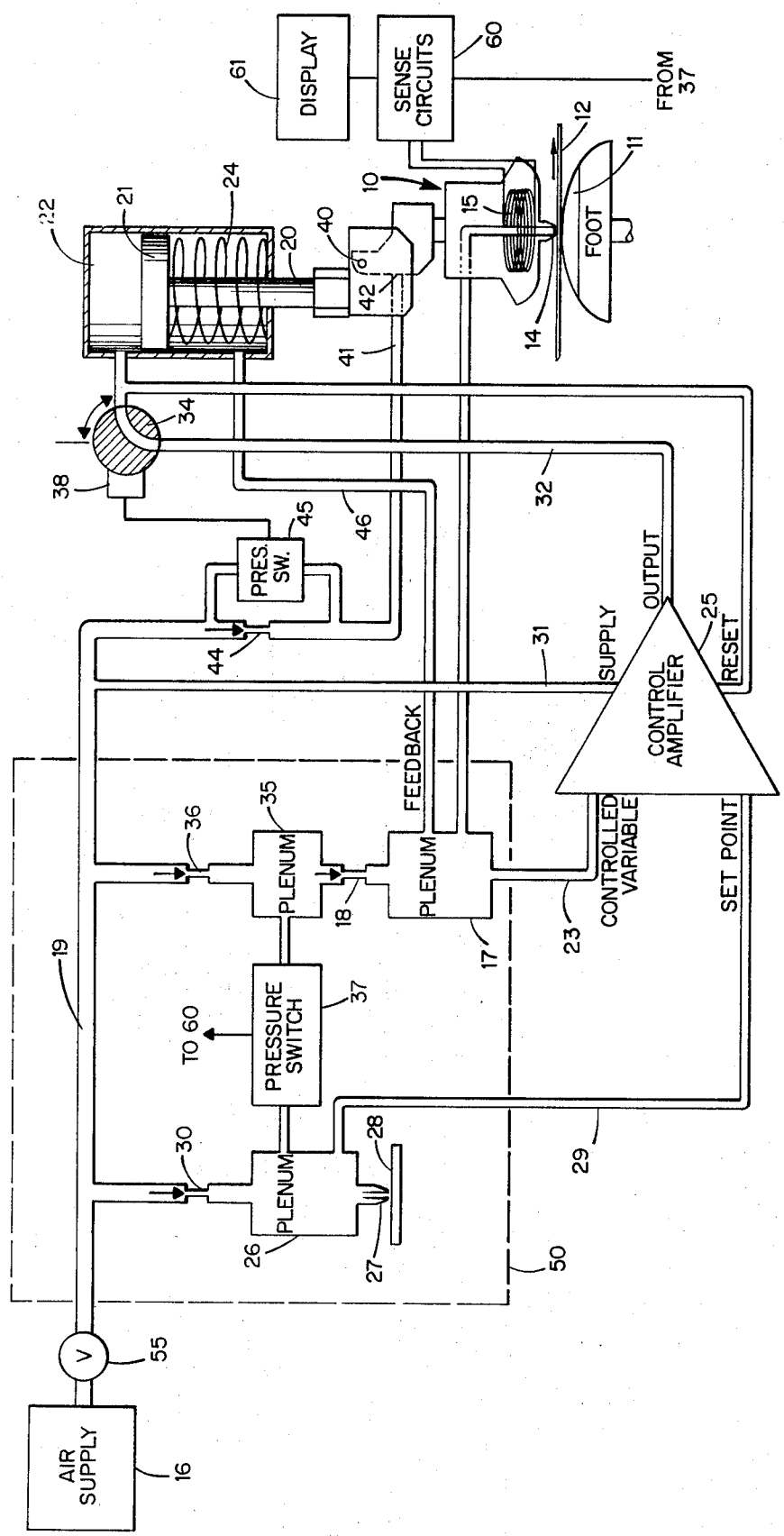
FIG. 1 is a diagramatic illustration of the inventive caliper gauge.

In FIG. 1, sensing head 10 is supported above a reference foot 11 of electrically conductive material such as aluminum. Moving sheet material 12 to be measured passes over foot 11 between foot 11 and head 10. Head 10 contains air nozzle 14 facing sheet material 12 and also inductive winding 15 for sensing the distance between head 10 and foot 11. Air or other gas from regulated supply 16 is connected to nozzle 14 through supply line 19 and a series of manifolds and plenum chambers. Air from supply 16 is forced through nozzle 14 and encounters backpressure determined by the proximity of the work sheet 12. Nozzle 14 is immediately connected to plenum chamber 17. Plenum chamber 17 is preceded by constriction 36. Due to constriction 36 in line from air supply 16, the pressure in plenum 17 will vary with changes in the backpressure at nozzle 14 reflected by the proximity of sheet 12.

The pressure in plenum 17 is a variable pressure which can be controlled by controlling the position of nozzle 14 relative to the surface of sheet 12. Thus, sensing head 10 is mounted on a piston rod 20 connected to air piston 21 mounted for reciprocation in air cylinder 22. Cylinder 22 and foot 11 are supported mutually from a floor or other foundation by structure not illustrated.

Coil spring 24 underneath piston 21 continuously urges piston 21 toward a retracted position moving sensing head 10 away from sheet 12. Air from supply 16 is connected to air cylinder 22 on the other side of piston 21 through control amplifier 25.

Control amplifier 25 operates as an automatic valve providing air pressure against piston 21 moving head 10 into the correct sense position. A suitable control amplifier for this purpose is available from Moore Products Company of Spring House, Pa. as "Nullmatic" Controller, Model 50. Control amplifiers, such as the Moore Model 50, compare a controlled variable to a desired value or set point and operate a valve to hold the controlled variable at the set point thus forming a feedback control system.

In FIG. 1 the pressure in plenum 17, as determined by backpressure on nozzle 14, is connected by line 23 to control amplifier 25 as the control variable. The set point can be established by a precisely regulated supply, but in accordance with the invention second plenum 26 is connected to second nozzle 27 facing the surface of plate 28 at a predetermined spacing. Plenum 26 is preceded by restriction 30 connected to air source 16. Thus, nozzle 27 directs air against the surface of plate 28 and the backpressure sets the pressure level in plenum 26. Plenum 26 is connected by line 29 to the set point input of control amplifier 25.

Air supply 16 is connected to a supply input of control amplifier 25 through supply line 31. This supply is connected through a control valve to output line 32 which is connected to air cylinder 22 through solenoid operated valve 34. Connected in this manner, control amplifier 25 provides air from source 16 to air cylinder 22 driving piston 21 and sensing head 10 in the direction of sheet material 12 until the reflected air pressure in plenum 17 is substantially equal to that in plenum 26.

Still a further constriction 18 and a further plenum 35 are interposed between plenum 17 and constriction 36. Pressure switch 37 is connected between plenum 26 and plenum 35 and is electrically connected to sense circuits 60. The function of switch 37 is to detect pressure differential in plenums 26 and 35 and disable any readout unless the pressure in plenum 35 is equal to or greater than the pressure in plenum 26. Plenum 35 is isolated by constriction 18 from plenum 17 to provide a normal positive bias in plenum 35 relative to plenum 26.

Sensing head 10 is mounted on pivot 40 at the end of piston rod 20. Tube 41 supplies air from supply 16 to orifice 42 normally closed by contact with a portion of sensing head 10. Sensing head 10 is pivoted such that if sensing head 10 is struck and moved by an obstruction on sheet 12, orifice 42 is opened. Constriction 44 in tube 41 is paralleled by second pressure switch 45. If orifice 42 is opened by movement of head 10, pressure drop across constriction 44 actuates switch 45 which is connected to actuate solenoid 38 moving valve 34 to the retract position. Solenoid 38 is connected to operate valve 34 and, when actuated, closes off line 32 to air cylinder 22 and opens air cylinder 22 to atmosphere.

Tube 46 connects plenum 17 to the lower portion of cylinder 22 under piston 21. Tube 46 constitutes a velocity feedback connection which upon downward motion of piston 21, increases the pressure in plenum 17 thereby decreasing the differential between the controlled variable input and the set input of control amplifier 25 as a function of piston velocity. Thus, tube 46 provides negative velocity feedback. This negative velocity feedback provides dynamic stability.

Figure 2:
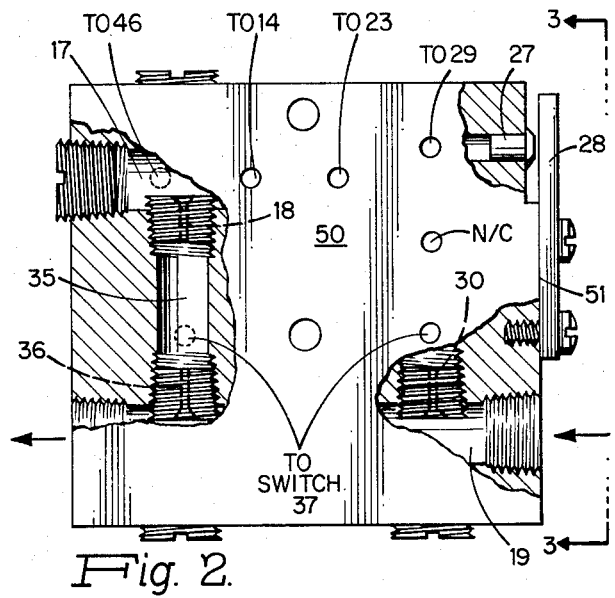
FIG. 2 is a front elevation of manifold apparatus showing the pneumatic connections and the reference air nozzle facing a fixed surface.

FIG. 2 depicts the outside appearance of manifold assembly 50 containing various plenums and constrictions. Assembly 50 is indicated by dashed outline in FIG. 1. Nozzle 27 and associated reference plate 28 are made integral with the manifold assembly 50 of FIG. 2. Thus, reference plate 28 is depicted as a flat plate of material secured to the side of assembly 50. Wood, plastic, metal, or glass may all be used for reference plate 28 and in some cases, it may be desirable to cover the surface of the plate facing nozzle 27 with a material identical to or similar to the layer to be measured. Changes in the space between nozzle 14 and the surface of a layer being measured can be effected by adding or removing shims 51 altering the space facing nozzle 27.

Figure 3:
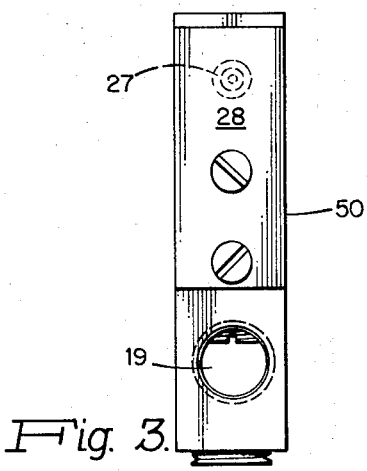
FIG. 3 is an end elevation of the apparatus of FIG. 2.

FIG. 3 is an end elevation showing plate 28 and the inlet of supply line 19. FIGS. 2 and 3 are illustrated in full scale to show the compact nature of the assembly.

Figure 4:
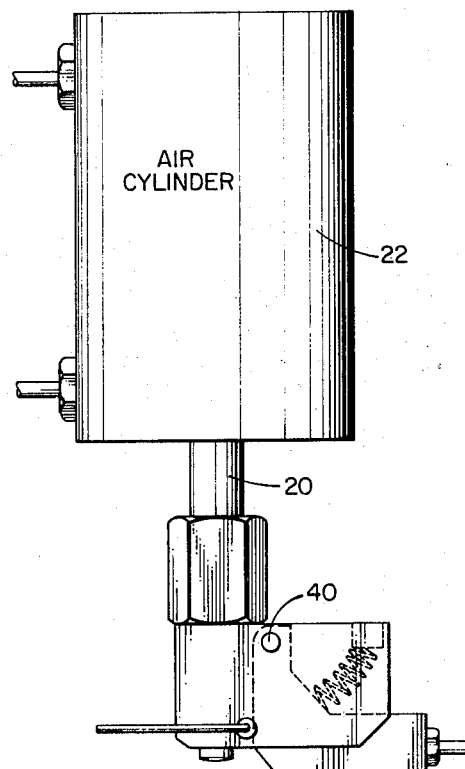
FIG. 4 is a front elevation of a sensing head according to the invention supported from an air cylinder.
Figure 4:
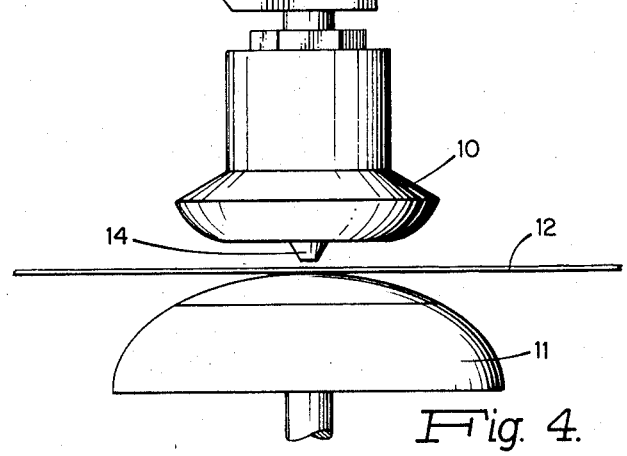

FIG. 4 depicts a configuration of sensing head 10 supported from air cylinder 22 as actually constructed. Pivot 40 is depicted as the end of a small cylindrical rod or rivetlike fastening. Nozzle 14 at the bottom of sensing head 10 has slanted faces to reduce deleterious effects from abrupt changes in thickness or obstructions in moving sheet 12. Above nozzle 14, sensing head 10 is an enlarged circular housing providing for ferrite cup core windings 15 as electromagnetic sensing elements.

The caliper gauge of the invention is normally put into operation by turning on air supply 16 by means of valve 55. Valve 34 connects output line 32 from control amplifier 25 to the upper portion of air cylinder 22. Now control amplifier 25 will provide pressure driving piston 21 in a downward direction until backpressure from nozzle 14 balances the backpressure from nozzle 27. Control amplifier 25 then insures that these pressures remain in equilibrium and thus that nozzle 14 remains at a predetermined spacing from sheet 12 relative to the spacing of nozzle 27 from plate 28. This spacing will be held constant irrespective of changes in thickness of sheet 12.

Piston 21 and sensing head 10 will move up and down with changes in thickness in sheet 12 in order to hold the space constant. As sensing head 10 moves up and down it carries sense windings 15 to and away from foot 11. Electromagnetic sensing windings 15 can be utilized in various ways to provide the desired readings.

Vachon in the said U.S. Pat. No. 3,513,555 discloses one approach using an inductance bridge. The sense winding may also be an inductance forming part of the tank of the oscillator circuit so that the oscillator will change frequency with the changing thickness of the sheet. The changing frequency can be detected and used to drive some sort of display. Reluctance or hysteresis are examples of phenomena that can vary with spacing to effect the changes. Connected to sense windings 15 is sense circuits 60 to derive the changes and scale, linearize and convert the output to drive a display. Display 61 may be an analog or digital display giving instantaneous thickness readings and/or a chart recorder for recording the measured thickness. The output of sense circuits 60 may also be analyzed by data processing and stored or utilized to operate signals or vary upstream processing parameters.

Other means to sense the space between sensing head 10 and foot 11 may be utilized without departing from the contemplated scope of the invention. For example the invention may be used to measure the layer thickness overlying steel reinforcing wire in an automotive tire. The steel wire would act the part of the reference foot.

While the invention has been described with relation to a specific embodiment, various modifications will be apparent to those skilled in the art, and it is intended to cover the invention within the full scope of the following claims.

We claim:

1. A caliper gauge for measuring the thickness of moving sheet material comprising:
   a. a reference plate over which sheet material is transported;
   b. a pivotally supported sensing head facing said plate such that said sheet material passes therebetween;
   c. a pneumatic nozzle in said sensing head facing said plate;
   d. a pneumatic feedback control system driving a pneumatic piston responsive to backpressure on said nozzle to move said sensing head maintaining said head a predetermined space from said sheet material;
   e. a pneumatic line, said line being closed by said sensing head in its normal pivotal position and opened by said sensing head being moved to an abnormal pivotal position;
   f. a pressure sensor, said pressure sensor being responsive to increased flow in said line to cause retraction of said piston; and
   g. means for continuously monitoring the spacing between said sensing head and said plate.

2. A caliper gauge according to claim 1 wherein said pressure sensor is a pressure sensitive switch connected pneumatically across a constriction in said line and electrically to a solenoid operated valve operable to release drive from said piston.

3. In a thickness gauge in which a sensing head is positioned a predetermined distance above the layer to be measured by a closed loop pneumatic system said closed loop pneumatic system comprising:
   a. A source of gas under pressure;
   b. A gas operated piston connected to said sensing head;
   c. A cyclinder enclosing said piston and having an upper end normally above said piston and a lower end normally below said piston;
   d. A pneumatic connection between said upper end and the output of a pneumatic control amplifier;
   e. A connection from said source of gas to a supply input of said control amplifier;
   f. A first nozzle in said sensing head positioned to face a layer to be measured;
   g. A pneumatic connection from said firt nozzle to a firt plenum chamber;
   h. A pneumatic connection from said first plenum chamber to said source of gas said connection containing an isolating constriction;
   i. A pneumatic connection from said first plenum chamber to a "controlled variable" input of said control amplifier;
   j. A second plenum chamber connected to a second nozzle;

k. A surface facing said second nozzle at a predetermined fixed spacing;
l. A pneumatic connection from said second plenum chamber to said source of gas containing a second isolating constriction;
m. A pneumatic connection from said second plenum chamber to a "set point" input of said control amplifier; and
n. Resilient means in said cylinder continuously urging said piston toward a retracted position in opposition to gas pressure from said control amplifier whereby the output of said control amplifier drives said piston and said sensing head in the direction of a layer to be measured until the spacing of said first nozzle from said layer reaches a predetermined relation with the spacing of said second nozzle from said surface.

4. Apparatus according to claim 3 wherein the lower portion of said cylinder is connected to said first plenum chamber by a pneumatic connection providing negative velocity feedback.

5. Apparatus according to claim 3 further comprising a pressure switch connected between said first plenum and said second plenum operative to disenable sense signals when the pressure in the said first plenum chamber is substantially less than the pressure in said second plenum chamber.

6. Apparatus according to claim 3 wherein said first plenum chamber, said second plenum chamber, said second nozzle, a plate carrying the surface facing second nozzle and said constrictive isolators are integral in a unitary manifold assembly connecting said source of gas to said control amlifier and said first nozzle.

7. A caliper gauge for measuring the thickness of moving sheet material comprising:
a. a reference plate over which sheet material is transported;
b. a sensing head supported facing said plate such that said sheet material passes therebetween;
c. a pneumatic nozzle in said sensing head facing said plate;
d. a pneumatic feedback control system driving a pneumatic piston responsive to backpressure on said nozzle to move said sensing head maintaining said head a predetermined space from said sheet material;
e. said control system including a control amplifier and a connection from below said pneumatic piston to provide velociity feedback to said amplifier such that the drive to said amplifier is reduced as a function of piston velocity; and
f. means for continuously monitoring the spacing between said sensing head and said plate.

8. Thickness measuring apparatus for continuously measuring the thickness of a moving layer of material comprising:
a. a sensing head;
b. a first pneumatic nozzle in said sensing head facing a layer of material to be measured;
c. a second pneumatic nozzle facing a first reference surface at a predetermined fixed spacing;
d. a pneumatic control amplifier connected to said first and said second pneumatic nozzle and driving a pneumatic piston responsive to backpressure differences between said first and said second pneumatic nozzle to move said sensing head keeping said backpressure in equilibrium and thereby maintaining said first nozzle at a constant space from said layer of material related to said predetermined fixed spacing;
e. said pneumatic piston being contained in a pneumatic cylinder and connected by a piston rod to said sensing head, the portion of said piston rod inside said cylinder being surrounded by a compression spring for urging said piston in a first direction, the end of said cylinder in said first direction containing a pneumatic inlet for gaseous pressure to drive said piston in a second direction against the force of said spring, the end of said cylinder in said second direction having a connection connecting said cylinder to the input of said control amplifier to provide velocity feedback; and
f. means to continuously monitor the distance from said sensing head to a second reference underlying said layer of material.

* * * * *